US008190778B2

(12) United States Patent
Shanbhogue (10) Patent No.: US 8,190,778 B2
(45) Date of Patent: May 29, 2012

(54) METHOD AND APPARATUS FOR NETWORK FILTERING AND FIREWALL PROTECTION ON A SECURE PARTITION

(75) Inventor: Vedvyas Shanbhogue, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 450 days.

(21) Appl. No.: 11/714,372

(22) Filed: Mar. 6, 2007

(65) Prior Publication Data

US 2008/0222309 A1   Sep. 11, 2008

(51) Int. Cl.
*G06F 15/16* (2006.01)
*G06F 15/173* (2006.01)
*G06F 9/00* (2006.01)

(52) U.S. Cl. ........ 709/250; 709/223; 709/224; 709/225; 713/1

(58) Field of Classification Search .................. 709/250, 709/223–225; 713/1
See application file for complete search history.

(56) References Cited

U.S. PATENT DOCUMENTS

| 2005/0198632 A1* | 9/2005 | Lantz et al. ................ 718/1 |
| 2005/0283640 A1* | 12/2005 | Cheston et al. .............. 714/4 |
| 2006/0069828 A1* | 3/2006 | Goldsmith ............... 710/100 |
| 2006/0070066 A1* | 3/2006 | Grobman ..................... 718/1 |
| 2006/0206300 A1* | 9/2006 | Garg et al. ................ 703/27 |
| 2007/0006175 A1 | 1/2007 | Durham et al. |
| 2007/0050767 A1* | 3/2007 | Grobman et al. ............ 718/1 |
| 2007/0266433 A1* | 11/2007 | Moore ..................... 726/15 |
| 2008/0184373 A1* | 7/2008 | Traut et al. ............... 726/26 |

* cited by examiner

*Primary Examiner* — Ashok Patel
*Assistant Examiner* — Kevin Bechtel
(74) *Attorney, Agent, or Firm* — Barnes & Thornburg LLP (57) ABSTRACT

A management virtual machine on a virtualization technology enabled platform includes a means for providing a firewall and deep packet inspection. An isolated secure partition is provided to host the management application and network packet filtering and firewall functions to provide a secure and trusted platform for manageability applications. A protected component in the operating system in a user partition moves network traffic to the secure partition for inspection and filtering.

20 Claims, 4 Drawing Sheets

METHOD AND APPARATUS FOR NETWORK FILTERING AND FIREWALL PROTECTION ON A SECURE PARTITION

FIELD

This disclosure relates to network filtering and firewall protection and in particular to protecting an operating system from malicious attacks from a communications network.

BACKGROUND

A computer system is a layered device that includes a hardware layer, a firmware and operating system layer, and an applications program layer. The hardware layer of the computer system is often referred to as a physical platform. The platform may include processors, chipsets, communications channels, memory, boards and systems. Typically, a single operating system controls all hardware layer resources in the computer system.

A virtual machine is one of a number of discrete execution environments in a computer system. Each virtual machine may execute an operating system and is isolated from the other virtual machines so that each virtual machine appears to a user to "own" all the hardware resources of the computer system. Typically, a virtual machine monitor (VMM), sometimes referred to as a virtual machine manager, provides the capability to share the computer system's hardware resources among the virtual machines. In some systems, a virtual machine monitor may simulate the complete hardware or partially simulate some of the hardware. In other systems, instead of simulating hardware, the virtual machine monitor may provide access to the hardware resources through an Applications Programming Interface (API). Thus, through the use of VMM, one physical platform can function as multiple "virtual" machines.

The physical platform may include a Network Interface Controller (Card) (NIC) which is a device for transmitting and receiving packets over a communications network such as a Wide Area Network (WAN) or a Local Area Network (LAN). A system may have many different types of NICs manufactured by different vendors that support different network protocols.

Due to the increased number of computer viruses and malicious attacks on data networks, it is time consuming to keep virus definitions and rules used for filtering and firewall functions up to date as per an information technology policy. Also systems must be periodically updated to protect against tampering of firewall/filtering functions by users or malware in order to provide a secure and trusted platform in which manageability applications may execute.

Typically, a para virtualized front-end/back-end driver is created for each different type of NIC. In this scheme the back-end driver in a secure operating system controls the NIC. The front-end driver in a user operating system communicates input/output (IO) requests to the back-end drivers in the secure operating system to access the NIC. Filtering software intercepts the traffic sent from the front end driver to the back end driver to perform the filtering and inspection.

However, a back end para-virtualized device driver must be created in the secure operating system for each different type of NIC. This may not be possible for all NICs. For example, some device drivers are developed by independent hardware vendors (IHV) or operating system vendors (OSV). Thus, virtual machine monitor (VMM) vendors may not have access to the device driver specifications or source code in order to create the back end para-virtualized device driver. Hence traffic received from network end points that do not have back end para-virtualized device drivers in the secure operating system cannot be filtered and inspected by the firewall and virus scanning software in the secure operating system.

Furthermore, some operating systems such as Microsoft® Windows® XP and Microsoft® Windows® Vista have stringent operating system device driver certification requirements. This makes achieving certifications for the front-end drivers difficult especially when the front-end and back-end drivers run on dissimilar operating systems. For example, the front-end may run on the Microsoft Vista operating system and the backend may run on the Linux operating system. Thus, this requires creating and supporting an operating system device driver for each operating system supported by the system which is time consuming and expensive.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

An embodiment of the present invention includes a management virtual machine and a user virtual machine. Connectivity to a network is provided to management applications residing in the management virtual machine through a device driver in the user virtual machine. The user virtual machine is isolated from the network upon detection of a virus infection or a hacker intrusion.

Network traffic entering a system from all network end points, for example, Universal Serial Bus (USB) Network Interface Controller or network card (NIC), Peripheral Component Interconnect Network Interface Controller, dial up adapters, infra-red, and blue tooth is to be subjected to inspection by a firewall and a deep packet inspection function in the management virtual machine.

Figure 1:
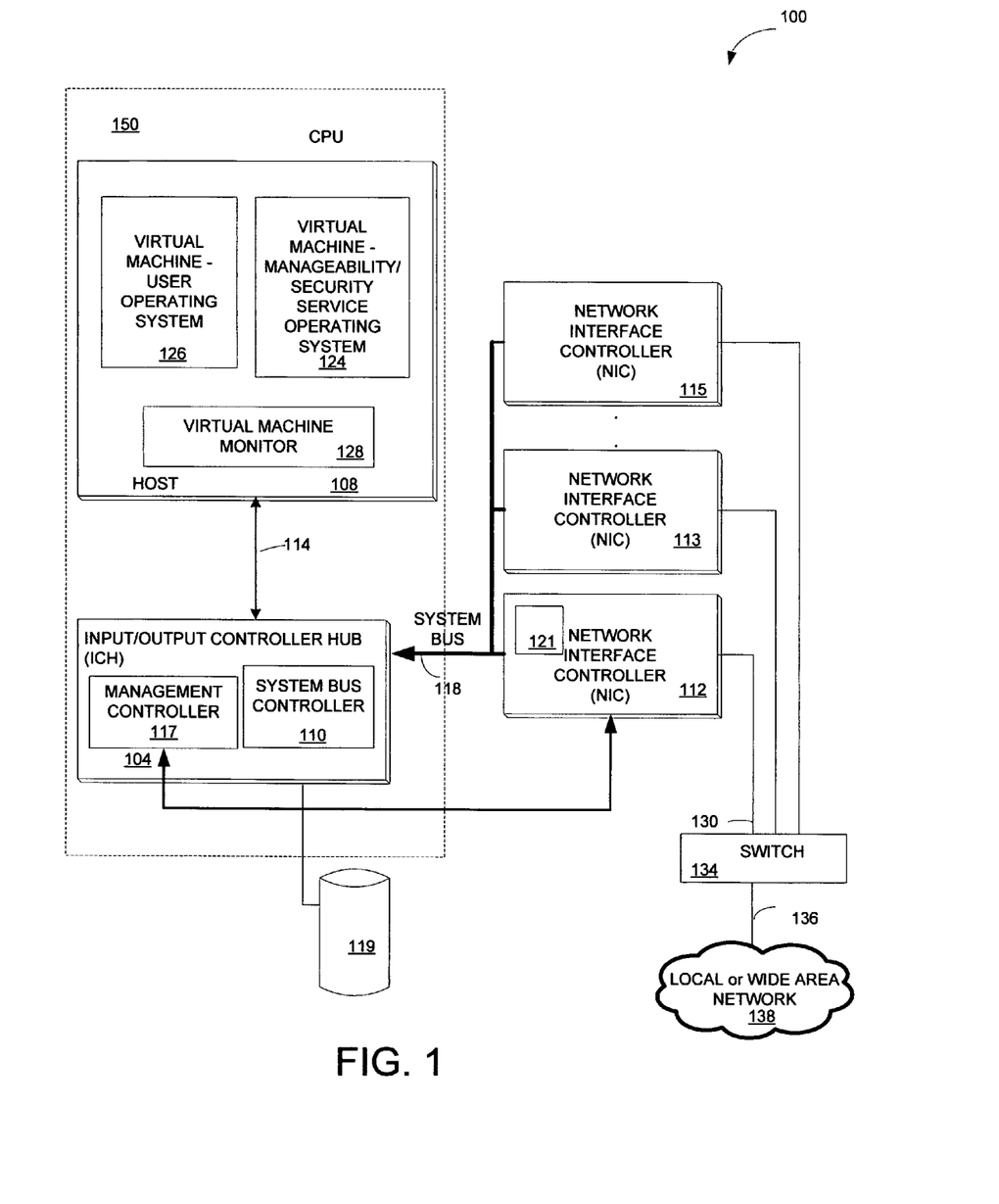
FIG. 1 is a block diagram of an embodiment of a system that performs network filtering and firewall protection on a secure partition according to the principles of the present invention.

FIG. 1 is a block diagram of an embodiment of a system that performs network filtering and firewall protection on a secure partition according to the principles of the present invention. The system 100 is a Virtualization Technology enabled platform. Virtualization Technology allows a single machine to run multiple operating systems at once. The system 100 includes a Central Processing Unit (CPU) 150 that includes a host 108, an I/O Controller Hub (ICH) 104 and NICs 112, 11, 115.

The host 108 may include any one or more of a plurality of processors such as a single core Intel® Pentium IV® processor, a single core Intel Celeron processor, an ® XScale processor or a multi-core processor such as Intel® Pentium D, Intel® Xeon® processor, or Intel® Core® Duo processor or any other type of processors.

The host 108 may also include memory such as Dynamic Random Access Memory (DRAM), Static Random Access Memory (SRAM), Synchronized Dynamic Random Access Memory (SDRAM), Double Data Rate 2 (DDR2) RAM, or Rambus Dynamic Random Access Memory (RDRAM) or any other type of memory.

In an embodiment, the host 108 may include a memory controller hub (MCH) coupled to the processor, memory and a graphics controller coupled to a display device such as a Liquid Crystal Display (LCD) panel.

The ICH 104 may be coupled to the host 108 using a high speed chip-to-chip interconnect 114 such as Direct Media Interface (DMI). DMI supports 2 Gigabit/second concurrent transfer rates via two unidirectional lanes. The ICH 104 may also include a storage controller for controlling access to storage devices coupled to the ICH 104, such as disk drive (hard drive) 119. In other embodiments the storage devices controlled by the ICH 104 may include a Digital Video Disk (DVD) drive, compact disk (CD) drive, Redundant Array of Independent Disks (RAID), or tape drive.

The ICH 104 may include a system bus controller 110 for controlling communication with devices, for example, NICs 112, 113, 115 coupled to the ICH 104 that communicate with the ICH over system bus 118. In one embodiment the system bus may be the Peripheral Component Interconnect (PCI) or the Peripheral Component Interconnect Express (PCI-e) bus. Each NIC 112, 113, 115 may be coupled to the ICH 104 and to each other through the system bus 118. In the embodiment shown, each of the NICs 112, 113, 115 are shown as separate components. In another embodiment one or more of the NICs 112, 113, 115 may be integrated with the ICH 104.

A NIC is typically implemented in hardware (physical layer) and allows communications with devices coupled to a communications network 138. In the embodiment shown, each NIC 112, 113, 115 may communicate with an external (off-platform) switch 134.

The external switch 134 has another network port 136 that allows the external switch 134 to be coupled to a communications network that may be a Local or Wide Area Network (LAN or WAN) 138. Thus, each NIC 112, 113, 115 may communicate through the switch 134 to remote devices (not shown) accessible via the LAN or WAN 138 using data-link protocols such as Ethernet, Token Ring, dial up network, infra-red, blue tooth or any other type of data-link protocol.

The system 100 may support virtualization, that is, provide the ability to create separate execution environments that may be referred to as "virtual machines". Each virtual machine is a discrete execution environment that runs an operating system. An operating system is software that controls the operation of a computer and directs the processing of programs. In the embodiment shown, the system has two virtual machines, a first virtual machine 126 runs a user operating system and a second virtual machine 124 runs a manageability/security service operating system.

A virtual machine monitor (VMM) 128 allocates system (platform) resources such as memory to each virtual machine 124, 126. The VMM 128 runs directly on the system's hardware and emulates a complete hardware environment for each virtual machine 124, 126. The virtual machines 124, 126 are not aware that they are sharing the system hardware.

Each of the virtual machines 126, 124 is isolated from the other virtual machines 124, 126 so that each of the virtual machines 124, 126 appears to a user to "own" all the hardware resources of the computer system 100. The virtual machine monitor (VMM) 128, sometimes referred to as a virtual machine manager, provides the capability to share the computer system's hardware resources among the virtual machines 124, 126. In some systems, a virtual machine monitor may simulate the complete hardware or partially simulate some of the hardware. In other systems, instead of simulating hardware, the VMM 128 may provide access to the hardware resources through an Applications Programming Interface (API). Thus, through the use of the VMM 128, one physical platform may function as multiple "virtual" machines 124, 126.

The ICH 104 includes a management controller 117. The management controller 117 implements various services on behalf of management applications. For example, the management applications may be Intel® Active Management Technology (AMT) applications such as asset management, third party data store or remote management. In an embodiment, the management controller 117 is implemented in firmware that is stored in non-volatile memory. A small amount of main memory in the host 108 is dedicated to execute the management controller firmware and store the management controller run-time data. This dedicated memory space is protected from being accessed by the processor in the host 108 in order to prevent malicious software from accessing the dedicated memory space.

In an embodiment, the system may be a computer system, for example, a personal computer. However, the invention is limited to computer systems and may be implemented on other computing devices that are capable of performing data communication and support creation of virtual machines. The network interface controller 112 includes an agent (embedded agent) 121 that is capable of collecting flow statistics for packets being transmitted to the network 138 and being received from the network 138. The flow statistics collected include information such as a Media Access Control (MAC) address, an Internet Protocol (IP) address, Transport Control Protocol (TCP)/Universal Data Protocol (UDP) port numbers etc. included in the headers of packets flowing to and from the network interface controller 112.

The management controller 117 in the ICH 104 interfaces with the network interface controller 112 and is capable of collecting the flow statistics maintained by the network interface controller 112. The management controller 117 may be accessed from the virtual machine manageability/security service operating system (SOS) 124.

Figure 2:
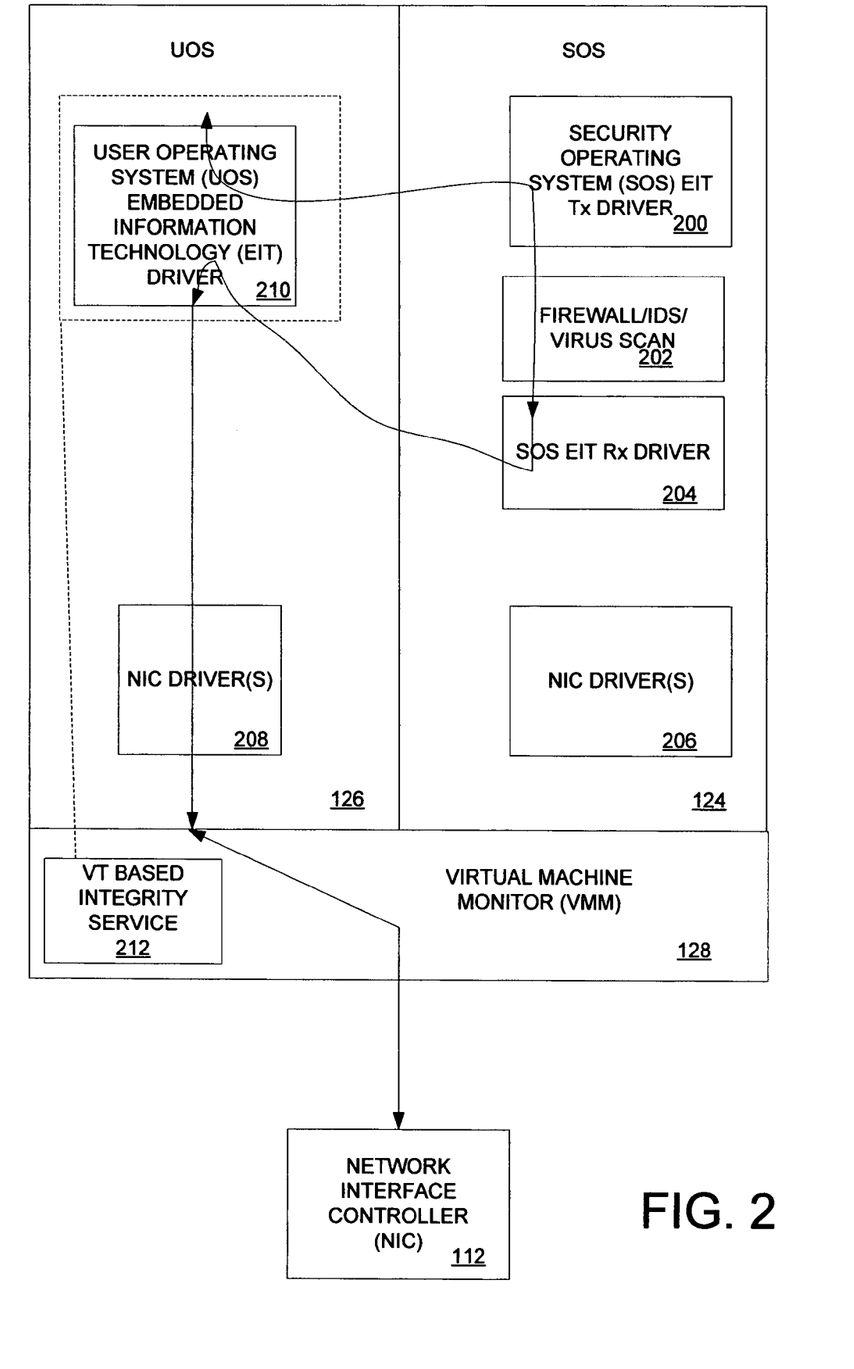
FIG. 2 is a block diagram illustrating an embodiment of the virtual machines shown in FIG. 1 for protecting an operating system from attacks received over a network.

FIG. 2 is a block diagram illustrating an embodiment of the virtual machines 124, 126 shown in FIG. 1 for protecting an operating system from attacks received over a network. Network data in the form of data packets may be transmitted and received through the NIC 112, 113, 115, VMM 128 and the virtual machines 126, 124.

The virtual machine for the user operating system (UOS) 126 and the virtual machine for the manageability/security service operating system (SOS) 124 share the VMM 128 and the NIC(s) 112, 113, 115. In the embodiment shown in FIG. 1, there are three NICs 112, 113, 115. However, in other embodiments there may be more or less NICs dependent on the network protocols supported by the system 100 as described earlier in conjunction with FIG. 1. In the embodiment shown in FIG. 2, support is provided for one type of NIC with a NIC device driver 208 in the UOS 126 to support one of the NICs 112, 113, 115 shown in FIG. 1.

The SOS 124 includes a SOS Firewall/Intrusion Detection System (IDS)/Virus scanning module 202, a Security Operating System (SOS) EIT Transmit Driver 200 and a SOS EIT Receive driver 204. The SOS 124 also includes a limited functionality NIC device driver 206. The UOS 126 includes a user operating system (UOS) embedded technology (EIT) driver 210 and a full-functionality NIC device driver 208.

The limited functionality NIC device driver 206 in the SOS 124 is a scaled down device driver, that is, a device driver that only has basic receive and transmit functionality. The limited functionality NIC device driver 206 is not 100% at par with features implemented in native operating system NIC device drivers, for example, full functionality NIC device driver 208. In normal operation the native operating system NIC device driver 208 is used and the limited functionality NIC device driver 206 is provided in the SOS 124 to recover from errors and attacks on the UOS 126.

The VMM 128 allows the Network Interface Controller (NIC) 112 to be shared by both virtual machines 124, 126. In the normal mode of operation, that is, when the UOS 126 is uncompromised, the VMM 128 assigns the NIC 112 to the UOS 126. Network traffic (which may be in the form of network packets (data packets)) received from or transmitted to the NIC 112 is filtered and inspected by the firewall/Intrusion Detection System (IDS)/Virus Scan module 202 in the SOS 126 as shown in FIG. 2.

As part of the boot up of the UOS 126, the UOS detects the NIC 112 plugged into the system and loads the respective NIC driver 208 that may be stored in storage device 119 to handle operations for the NIC 112. A NIC 112 may also be plugged into the system 100 at run time when the UOS 126 is operational. During run time, upon detecting using plug and play mechanisms that a NIC 112 has been plugged into the system, the UOS 126 loads the NIC driver 208 for the inserted NIC 112.

The UOS EIT driver 210 is loaded into the UOS 126 as a filter driver. For example, in the case Microsoft® Windows operating systems, the UOS EIT driver 210 may be an intermediate driver in the Network Driver Interface Specification (NDIS) driver stack. In an embodiment in which the UOS is a Linux operating system, the UOS EIT driver 210 may be a netfilter module inserted to intercept the network traffic. The UOS EIT driver 210 binds with each NIC driver instance 208 in the UOS 126. All traffic received from or sent to the NIC driver 208 is thus intercepted by the UOS EIT driver 210. By having a minimal component, that is, the UOS EIT driver 210 in the UOS 126 and protecting it against attacks it is possible to ensure the integrity of the UOS.

Referring to FIG. 2, the SOS 124 also includes a limited functionality NIC device driver 206 for the NIC 112. In the normal mode of operation the limited functionality NIC device driver 206 in the SOS partition 124 is not active. The SOS EIT Rx driver 204 and the SOS EIT Tx driver 200 register as filter drivers in the SOS 124 and intercept all packets received and transmitted from the SOS network stack. The SOS EIT Rx driver 204 and SOS Tx driver 200 also establish communication with the UOS EIT driver 210.

In the transmit path, data to be transmitted leaves the UOS EIT driver 210 in the UOS 126 and is processed by the SOS EIT Tx Driver 200, the Firewall/IDS/Virus Scan module 202 and the SOS EIT Rx Driver 204. The processed data is returned from the SOS 124 to the UOS EIT Driver 210 in the UOS 126 and then forwarded to the full-functionality NIC device driver 208 in the UOS 126. The full-functionality NIC device driver 208 in the UOS 126 forwards the network data to the VMM 128 and the VMM 128 forwards the network data to the NIC 112 to be transmitted over the communications network.

The receive path is similar to the transmit path. Data received from the communications network by the NIC 112 is forwarded to the VMM 128. The VMM 128 forwards the received data to the full-functionality NIC device driver 208 in the UOS 126. The full-functionality NIC device driver 208 in the UOS 126 forwards the received data to the UOS EIT driver 210. Received data leaves the UOS EIT driver 210 in the UOS 126 is processed by the SOS EIT Rx Driver 204, Firewall/IDS/Virus Scan 202 and SOS EIT Tx Driver 200. The processed data is returned from the SOS 124 to the UOS EIT driver 210 in the UOS 126.

The integrity of the UOS EIT driver 210 may be protected using a Virtualization Technology (VT) based integrity protection technology referred to as VIS (VT based Integrity Services) 212 that resides in the VMM 128 and monitors memory pages in which the UOS EIT driver 210 is stored.

The UOS EIT driver 210 may be attacked by malware in many different ways. For example, a spurious UOS EIT driver 210 may be loaded in the UOS 126 or the UOS EIT driver binary code that is stored in memory may be modified. This may result in denial of service, packet modification, filtering of selective packets or spurious packet generation.

In order to protect against modification of the UOS EIT driver 210, the VMM 128 includes a Virtualization Technology based Integrity Services Network (VISN) 212, which may also be referred to as a memory firewall. Using VISN 212, shared memory pages may be placed under a protected page table so that the shared memory pages are accessible only when the UOS EIT driver 210 is active.

The UOS EIT driver 210 may register with the VISN 212 of the VMM 128 for protection. In various embodiments, the registration may take place upon an occurrence of a registration event, for example loading of active content into memory, periodically, and/or in some other event-driven manner. In various embodiments, the registration may be initiated by the UOS EIT driver 210, the UOS 126 or the VMM 128. Upon receiving the registration, the VISN 212 may cooperate with an integrity measurement module (IMM) to verify integrity of the user operating system 126. Verification of the integrity of the user operating system 126 may help to prevent unauthorized modification and/or malicious termination, and may ensure that only recognized components may be afforded protection.

The IMM may provide the VISN 212 a response to verification request such as pass, fail, pass w/qualification, fail w/qualification, etc. In various embodiments, qualifications may reflect degrees of integrity verification between pass and fail.

An embodiment of the invention protects against attacks on the UOS EIT driver 210. A malignant software component such as a virus or Trojan may try to disable the UOS EIT driver 210 from the protocol stack of the UOS 126. Alternately, the malignant software may replace the driver code for the UOS EIT driver that is stored on a hard drive 119 coupled to the ICH 104 with a modified UOS EIT driver 210 that disables the protections provided by the firewall.

When the UOS EIT driver is loaded into memory, for example, copied from the hard drive 119 by the UOS 126, the User OS EIT driver 210 registers with the VISN module 212. The VISN module 212 verifies the integrity of the loaded UOS EIT driver 210, for example, by computing the size of the code image loaded into memory. After the UOS EIT driver 210 has been loaded and verified, the VISN module 212 enables protection of the memory pages used to store the UOS EIT driver 210 thereby protecting the image of the UOS EIT driver 210 stored in memory from tampering by malignant software.

The VISN module 212 can detect tampering of the image of the UOS EIT driver stored on the hard drive 119 or tampering of the image of the UOS EIT driver during the loading process. If the VISN module 212 detects tampering, the VISN module 212 notifies the SOS 124. The notification of tampering is used by the SOS to carry out mitigation actions such as reclaiming the NIC driver 208 and carrying out remediation actions to restore the integrity of the UOS EIT driver 210.

In an embodiment, the UOS EIT driver protects against an attack to try to disable the User OS EIT driver and thereby disable the firewall protection after the UOS EIT driver has been loaded. To protect against this type of attack, the UOS EIT driver 210 provides a heartbeat to indicate that it is alive. In an embodiment, the heartbeat is in the form of a message that includes a sequence number and a secure hash of the sequence number —$[Sq, H[Sq]_k]$—where H is a hash function that hashes the sequence number Sq using key 'k'.

The key used to perform this hashing and the initial sequence number is patched into the UOS EIT driver 210 by the VISN module 212 by editing the code image of the UOS EIT driver 210 while checking the UOS EIT driver 210 after it has been loaded. The key and the sequence number are thus protected from being accessed by any other malignant software. Furthermore, by using a random sequence number as the starting sequence number any attempts to replay or fake the heartbeat messages can be detected. If the heartbeat is lost or tampered with the SOS is informed to initiate remediation actions.

In yet another embodiment, the UOS EIT driver 210 protects against malignant software that may try to insert itself between the User OS EIT driver 210 and the NIC driver 208. This attack may result in blocking packets from reaching the UOS EIT driver 210 or injecting spurious packets into the network.

In order to detect such attacks, the SOS EIT Rx driver 204 and the SOS EIT Tx driver 200 also maintain flow statistics for the packets that have been submitted to them for filtering and inspection. The flow statistics maintained by the SOS EIT Rx 204 driver and the SOS Tx driver 200 are compared against the flow statistics maintained by the NIC 112.

A mismatch in the flow statistics indicates an attempt to bypass the firewall. After detecting such anomalous behavior the SOS 126 can take remediation action to isolate the UOS 126 and remove the malignant software. Additionally, the UOS EIT driver 210 monitors the protocol stack in the UOS 124 in order to detect a spurious driver that may load as a filter driver between the UOS EIT driver 210 and the NIC driver 208.

Only one virtual machine 126, 124 may control the NIC 112 at any time. During normal operation the VMM 128 assigns control of the NIC 112 to the UOS 126. However, if the UOS 126 becomes compromised or becomes unavailable due to an operating system crash or any other software failure, the SOS 124 may request that the VMM 128 reassign the NIC 112 from the UOS 126 to the SOS 124.

In one embodiment, the SOS 124 requests reassignment of the NIC 112 through the use of a hypervisor call (hypercall) to the VMM 128. A hypercall from an operating system in a virtual platform is similar to the supervisor call that is typically used in many operating systems. In an embodiment an "ASSIGN DEVICE" hypercall is provided to allow a device to be dynamically reassigned to a virtual machine 124, 126. As this hypercall performs a privileged operation, this hypercall may only be available to a privileged and trusted virtual machine, for example, the SOS 124 in the system 100. The SOS 124 includes the identification of the NIC 112 in the hypercall.

For example, in an embodiment in which the NIC has a PCI interface to allow communication over a PCI bus, the identification provided may include the bus/device/function number of the NIC 112 and the identifier of the target virtual machine 126 to which the NIC 112 should be "connected". The VMM 128 disconnects the NIC 112 from the UOS 126 and connects the NIC 112 to the SOS 124 thereby isolating the UOS 126 from the communications network 138.

Figure 3:
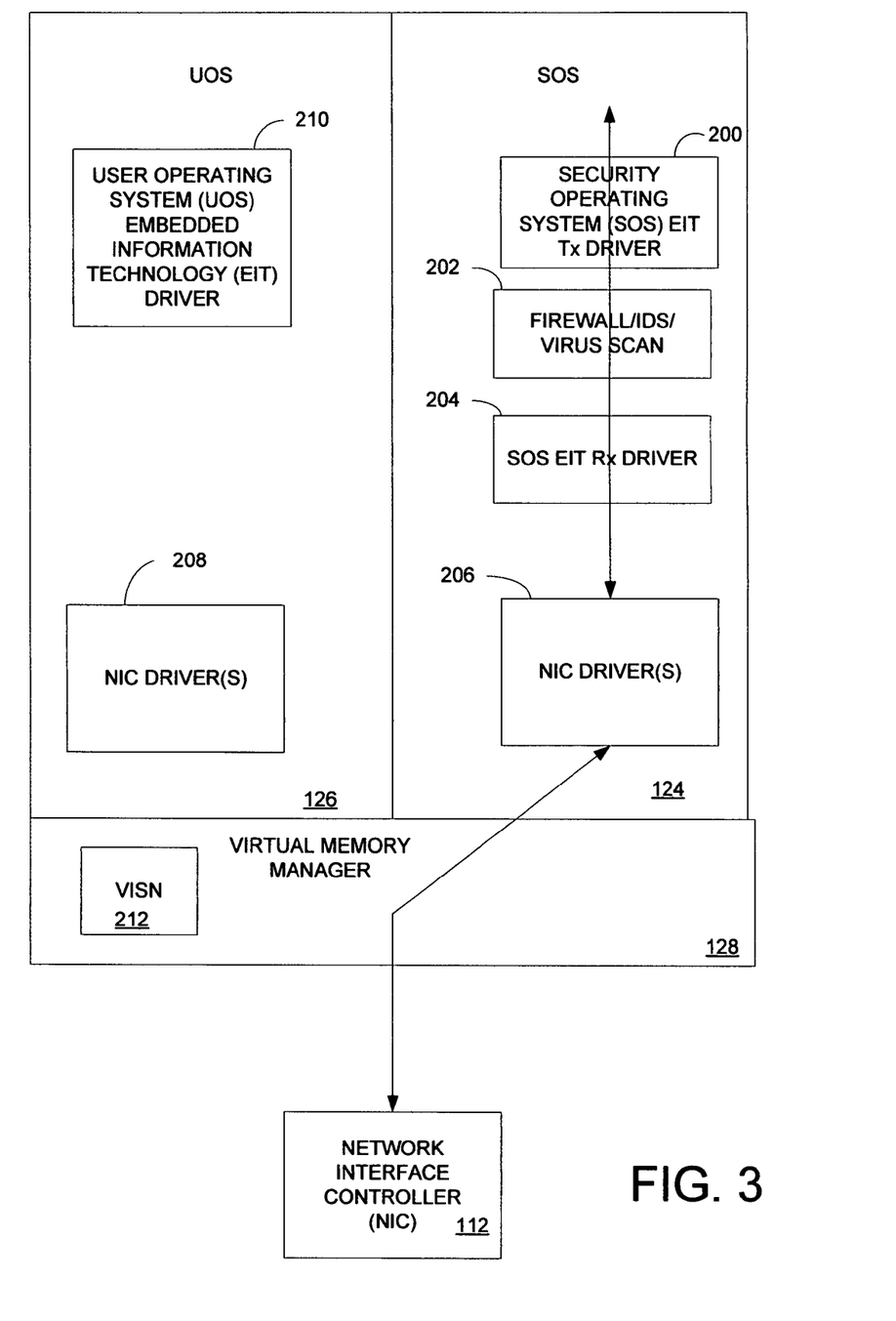
FIG. 3 is a block diagram illustrating an embodiment of the virtual machines shown in FIG. 2 after the VMM has switched control of the NIC to the limited functionality Network Interface Controller (NIC) driver.

FIG. 3 is a block diagram illustrating an embodiment of the virtual machines 124, 126 shown in FIG. 2 after the VMM 128 has switched control of the NIC 112 to the limited functionality Network Interface Controller (NIC) driver 206.

In the embodiment shown, the system bus 118 coupling the NIC 112 to the ICH 104 may be a PCI bus. Upon receiving an ASSIGN DEVICE hypercall, the VMM 128 locates the PCI configuration space of the NIC 112 that is being requested for reassignment. After locating the NIC 112, the VMM 128 powers off the NIC 112, for example, by placing the device in a sleep (D3) state or through the use of a function level reset. The VMM 128 remaps the Base Address Registers (BAR) of the NIC 112 into the target virtual machine 124, that is, the SOS space. The VMM 128 then reprograms the Virtualization Technology for Directed Input/Output (I/O) (VT-d) remap tables for the NIC 112 to add the tables to the remap tables of the target virtual machine 124. The VMM 128 remaps the interrupts for the NIC 112 to be routed to the SOS 124 instead of the UOS 126 and powers on the NIC 112.

The SOS 124 has access to the communications network through the VMM 128 and the NIC 112 and may thus use the network access to remediate the system. For example, the SOS 124 may obtain patches, restore the UOS image from a backup image or clean infections in the UOS 126 over the communications network. After the UOS 126 has been re-mediated, the management applications in the SOS partition 124 may issue an "ASSIGN DEVICE" hypercall requesting that the NIC 112 be re-assigned back to the UOS 126.

An embodiment of the invention, allows network traffic entering the system from any NIC 112 for which a device driver is provided in the UOS 126 to be subjected to inspection by firewall and deep packet inspection functions. For example, the NIC 112 may handle network traffic for USB NIC, PCI NIC, dial up adapters, infra-red, blue tooth and any other network protocols. Para-virtualization of network interface drivers is not required because the device drivers for the NIC 112 on the two virtual machines 124, 126 are unrelated. Thus, they do not need to be feature by feature on par with each other as required for para-virtualized systems. Network connectivity is provided to management applications residing in the management partition at all times—either through the UOS 126 or by acquiring the NIC 112 using the "ASSIGN DEVICE" hypercall. The UOS 126 is isolated from the network on detection of infections or hacker intrusions.

Figure 4:
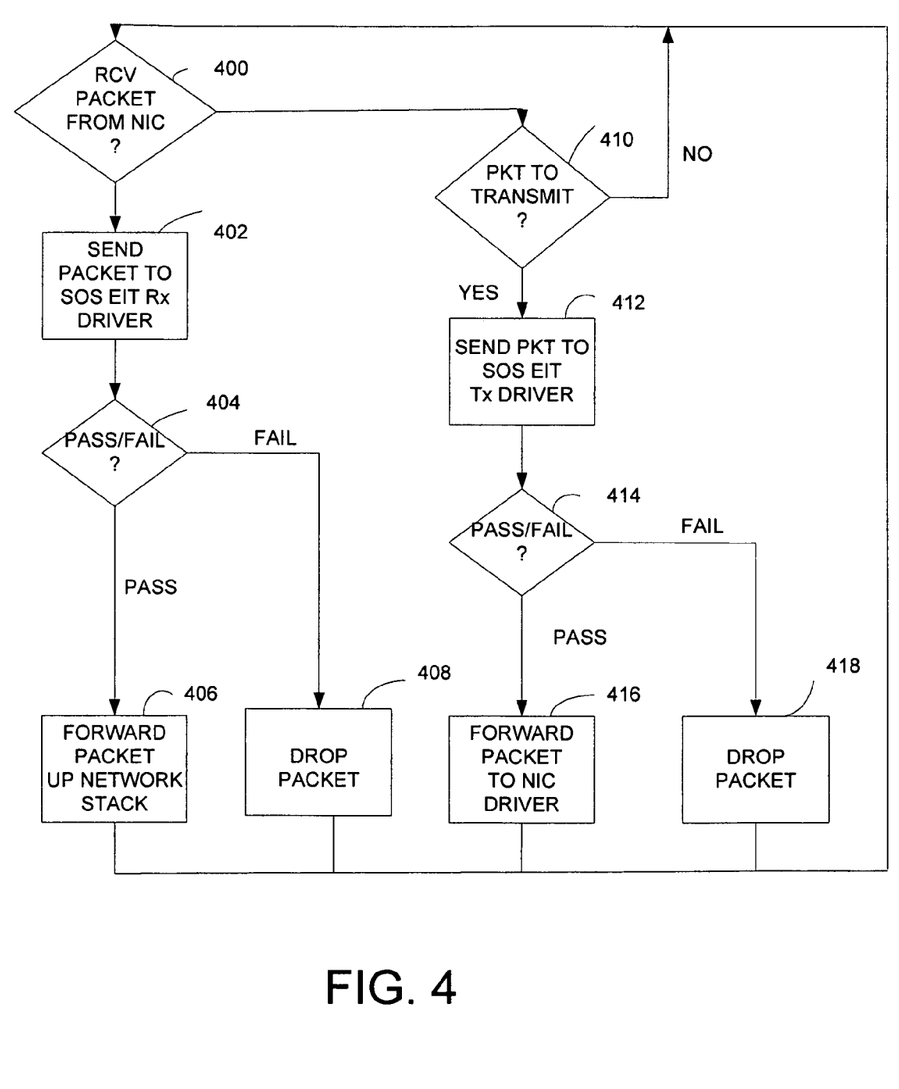
FIG. 4 is a flowgraph that illustrates an embodiment of a method implemented in the user operating system (UOS) embedded information technology (EIT) driver for handling data packets to be processed by a secure operating system (SOS).

FIG. 4 is a flowgraph that illustrates an embodiment of a method implemented in the UOS EIT driver 210 for handling data packets to be processed by the SOS. The data packets received from the communications network through the NIC or data packets to be transmitted over the communications network by the NIC.

A data packet received from the network by the NIC 112 is processed by the corresponding NIC driver 208 in the UOS 126. The NIC driver 208 performs processing on the received packet such as reassembling packet fragments and performing MAC level processing and indicates to the UOS 126 that the packet has been received. The UOS then forwards the packet to the UOS EIT driver 210 as the UOS EIT driver 210 is loaded as a filter in the traffic path.

At block 400, upon detecting that a data packet has been received from the NIC driver 208, processing continues with block 402. If no, data packet has been received, processing continues with block 410.

At block 402, the UOS EIT driver 210 sends the data packet to the SOS EIT Rx driver 200 in the SOS 124. The UOS EIT driver 210 may use different mechanisms, for example, copying the packet to a shared memory or page-flipping to send the packet to the SOS 124. Processing continues with block 404.

At block 404, the UOS EIT driver 210 waits for the SOS 124 to determine whether the data packet needs to be dropped or is safe to forward the packet further up the UOS network stack. While the UOS EIT driver 210 waits, the SOS EIT Rx driver 204 sends the packet through the network security modules 202 that implement network security such as firewalls, intrusion detection programs, and virus scanning programs to determine if the packet is a malicious packet.

If the packet is a malicious packet, the network security modules indicate to the SOS EIT Rx driver 204 that the packet needs to be dropped. This failure verdict is then conveyed to the UOS EIT driver 210. The verdict may be conveyed using various mechanisms such as through a shared memory between the UOS 126 and SOS 124, or by a message sent from the SOS 124 to the UOS 126. On receiving a failure verdict, processing continues with block 408.

If the received packet is not a malicious packet and passes all the inspections carried out by the network security modules 202, the packet reaches the SOS EIT Tx driver 200. The SOS EIT Tx driver 200 determines if the packet is destined for the network stack in the UOS 126 or the network stack in the SOS 124. The determination may be based on various criteria such as the destination Internet Protocol (IP) address of the packet, destination Transmission Control Protocol/User Datagram Protocol (TCP/UDP) port, identifiers present in the packet or any other combination of rules created based on the contents of the received data packet.

If the received data packet should be forwarded to the network stack in the UOS 126, the SOS EIT Tx driver 200 sends a "pass" verdict to the UOS EIT driver 210. The verdict may be conveyed using various mechanisms such as indications through a shared memory between the UOS 126 and the SOS 124 or messages sent from the SOS 126 to the UOS 126. On receiving a pass verdict, processing continues with block 406.

If the received data packet should be forwarded to the network stack in the SOS 124, the SOS EIT Tx driver 200 indicates a "fail" verdict to the User OS EIT driver and then forwards the packet to the network stack in the SOS 124. The UOS EIT driver 210 on receiving the fail verdict drops the packet as this packet is now consumed by the SOS.

At block 406, the UOS EIT driver 210 forwards the packet further up the network stack in the UOS 126. Processing continues with block 400 to wait for another data packet to process.

At block 408, the UOS EIT driver 210 drops the received packet. Processing continues with block 400 to wait for another data packet to process.

At block 410, if the UOS EIT driver 210 intercepts a data packet received from a network stack in the UOS to be sent to a suitable NIC driver for transmission over the communications network, processing continues with block 412.

At block 412, the UOS EIT driver 210 sends the packet to the SOS EIT Tx driver 200 in the SOS 124. The User OS EIT driver 210 may use different mechanisms such as copying the packet to a shared memory or page-flipping to send the packet to the SOS 124. Processing continues with block 414.

At block 414, the UOS EIT driver 210 waits for a verdict from the SOS 124 to determine whether the data packet needs to be dropped or whether the data packet is safe to forward to the NIC driver 208. The SOS EIT Tx driver 200 sends the data packet through the network security modules 202 that implement network security such as firewalls, intrusion detection programs and virus scanning programs to verify that the data packet is not a malicious packet.

If the data packet is a malicious packet, the network security modules 202 indicate to the SOS EIT Tx driver 200 that the packet needs to be dropped. This failure verdict is then conveyed to the UOS EIT driver 210. The verdict may be conveyed using various mechanisms such as indications through a shared memory between the UOS 126 and SOS 124, or a message sent from the SOS 124 to the UOS 126. On receiving a failure verdict, processing continues with block 418.

If the data packet is not a malicious data packet and passes all the inspections carried out by the network security modules 202, the data packet reaches the SOS EIT Rx driver 204. The SOS EIT Rx driver 204 determines if the data packet is destined for the network stack in the UOS 126 or the network stack in the SOS 124. The determination may be based on various criteria such as the destination IP address of the data packet, destination TCP/UDP port, identifiers present in the data packet or any other combination of rules created based on the contents of the received data packet. If the data packet should be forwarded to the communications network through the NIC 112, the SOS EIT Rx driver 204 sends a "pass" verdict to the UOS EIT driver 210. The verdict may be conveyed using various mechanisms such as indications through a shared memory between the UOS 126 and the SOS 124 or a message sent from the SOS 124 to the UOS 126. After receiving a pass verdict, processing continues with block 416.

If the packet should be forwarded to the network stack in the SOS 124, the SOS EIT Rx driver 204 indicates a "fail" verdict to the UOS EIT driver 210 and then forwards the data packet to the network stack in the SOS 124. The UOS EIT driver 210 upon receiving the fail verdict drops the packet as this packet is now consumed by the SOS 124.

At block 416, the UOS EIT driver 210 forwards the data packet to the NIC driver 208 for transmission through the NIC 112 to the communications network. Processing continues with block 400 to process another data packet.

At block 418, the UOS EIT driver 210 drops the data packet. Processing continues with block 400 to process another data packet.

The SOS EIT Tx driver 200 also intercepts data packets generated for transmission through the NIC 112 to the communications network by the network stack on the SOS 124. The SOS EIT Tx driver 200 sends these data packets through the network security modules 202 for inspection. If the data packets pass the inspection they reach the SOS EIT Rx driver 204. The SOS EIT Rx driver 204 sends the data packets to the UOS EIT driver 210 for transmission through the NIC 112 to the communications network. Upon receiving these data packets from the SOS 124, the UOS EIT driver 210 sends the data packets to the NIC driver 208 for transmission through the NIC 112 to the communications network.

Thus, known and future network interfaces may be added in a transparent manner without the need for para-virtualization of device drivers and without the need for these device drivers to reside in the SOS 124. Furthermore, the SOS 124 may sequester a NIC as required to implement functions such as network circuit breaker and endpoint access control.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
   a memory;
   a non-virtualized network interface controller;
   a first virtual machine to host a user operating system, the user operating system comprising:
      a protected filter driver loaded in the memory by the first virtual machine; and
      a native device driver for handling network traffic to be transmitted and received over a communications network between the non-virtualized network interface controller and the protected filter driver, the non-virtualized network interface controller assigned to the first virtual machine by a Virtual Machine Monitor; and
   a second virtual machine to host a security operating system, the security operating system comprising:
      a security filter driver loaded in the memory by the second virtual machine, wherein the protected filter driver is to move network traffic received from the first native device driver to the security filter driver for inspection and filtering; and
      a network security module loaded in the memory by the second virtual machine to receive, from the security filter driver, the network traffic first received by the security filter driver, the network security module further to determine whether the network traffic first received by the security filter driver is malicious,
      wherein the network security module further to (i) cause the network traffic to be dropped in response to determining that the network traffic is malicious or (ii) cause the network traffic to be returned to the protected filter driver loaded in the first virtual machine in response to determining that the network traffic is not malicious.

2. The apparatus of claim 1, wherein upon detecting a security breach, the second virtual machine to issue a request to the Virtual Machine Monitor to isolate the first virtual machine from the communications network and to dynamically assign the network interface controller to the second virtual machine.

3. The apparatus of claim 2, wherein the second virtual machine further comprising:
   a limited functionality device driver for handling network traffic to be transmitted and received over a communications network between the network interface controller and the security filter driver via the Virtual Machine Monitor.

4. The apparatus of claim 3, wherein the limited functionality device driver only has basic receive and transmit functionality for the network interface controller.

5. The apparatus of claim 4, wherein the first native device driver is a native operating system network interface controller device driver.

6. The apparatus of claim 1, wherein exclusive access to the network interface controller is switchable between the first virtual machine and the second virtual machine.

7. The apparatus of claim 1, wherein: (i) the security operating system is stored in a separate partition from the user operating system; (ii) the non-virtualized network interface controller is shared by the virtual machines; (iii) the Virtual Machine Monitor is to assign exclusive access to the non-virtualized network interface controller to one of the virtual machines to allow the protected filter driver to be isolated from the communications network; (iv) the Virtual Machine Monitor is to monitor accesses to pages in which the protected filter driver is stored; and (v) the protected filter driver and security filter driver are software filter drivers.

8. A method comprising:
   handling network traffic by a native device driver in a first virtual machine, the network traffic to be transmitted and received over a communications network between a non-virtualized network interface controller and a protected filter driver loaded in the first virtual machine, the non-virtualized network interface controller assigned to the first virtual machine by a Virtual Machine Monitor; and
   moving, by the protected filter driver loaded in the first virtual machine, network traffic received from the native device driver to a security filter driver loaded in a second virtual machine for inspection and filtering;
   transferring, from the security filter driver, the network traffic to a network security module loaded in the second virtual machine;
   determining, by the network security module loaded in the second virtual machine, whether the network traffic is malicious;
   dropping the network traffic in response to determining that the network traffic is malicious; and
   returning the network traffic to the protected network filter loaded in the first virtual machine in response to determining that the network is not malicious.

9. The method of claim 8, further comprising:
   upon detecting a security breach, isolating by the Virtual Machine Monitor in response to a request from the second virtual machine, the first virtual machine from the network; and
   dynamically assigning, by the second virtual machine, the network interface controller to the second virtual machine.

10. The method of claim 9, further comprising:
    handling network traffic to be transmitted and received over the communications network between the network interface controller and the security filter driver, by a limited functionality device driver in the second virtual machine via the Virtual Machine Monitor.

11. The method of claim 10, wherein the limited functionality device driver only has basic receive and transmit functionality for the network interface controller.

12. The method of claim 11, wherein the first native device driver is a native operating system network interface controller device driver.

13. The method of claim 8, wherein exclusive access to the network interface controller is switchable between the first virtual machine and the second virtual machine.

14. The method of claim 8, wherein: (i) the security operating system stored in a separate partition from the user operating system; (ii) the non-virtualized network interface controller is shared by the virtual machines; (iii) the Virtual Machine Monitor is to assign exclusive access to the non-virtualized network interface controller to one of the virtual machines to allow the protected filter driver to be isolated from the communications network; (iv) the Virtual Machine Monitor is to monitor accesses to memory pages in which the protected filter driver is stored; and (v) the protected filter driver and security filter driver are software filter drivers.

15. A computer usable non-transitory medium including a computer readable code stored thereon having associated information, which when executed, results in a machine performing:

handling network traffic by a native device driver in a first virtual machine, the network traffic to be transmitted and received over a communications network between a non-virtualized network interface controller and a protected filter driver loaded in the first virtual machine, the non-virtualized network interface controller assigned to the first virtual machine by a Virtual Machine Monitor; and moving, by the protected filter driver loaded in the first virtual machine, network traffic received from the first native device driver to a security filter driver loaded in a second virtual machine for inspection and filtering;

transferring, from the security filter driver, the network traffic to a network security module loaded in the second virtual machine;

determining, by the network security module loaded in the second virtual machine, whether the network traffic is malicious;

dropping the network traffic in response to determining that the network traffic is malicious; and returning the network traffic to the protected network filter loaded in the first virtual machine in response to determining that the network is not malicious.

16. The computer usable medium of claim 15, wherein the machine performing:

upon detecting a security breach, isolating by the Virtual Machine Manger in response to a request from the second virtual machine, the first virtual machine from the network; and dynamically assigning, by the second virtual machine, the network interface controller to the second virtual machine.

17. The computer usable medium of claim 15, wherein the machine further performing:

handling network traffic to be transmitted and received over a communications network between the network interface controller and the security filter driver, by a limited functionality device driver in the second virtual machine via a Virtual Machine Manager.

18. The computer usable medium of claim 17, wherein the limited functionality device driver only has basic receive and transmit functionality for the network interface.

19. The computer usable medium of claim 18, wherein the first native device driver is a native operating system network interface controller device driver.

20. The computer usable medium of claim 15, wherein: (i) the security operating system stored in a separate partition from the user operating system; (ii) the non-virtualized network interface controller is shared by the virtual machines (iii) the Virtual Machine Monitor is to assign exclusive access to the non-virtualized network interface controller to one of the virtual machines to allow the protected filter driver to be isolated from the communications network; (iv) the Virtual Machine Monitor is to monitor accesses to memory pages in which the protected filter driver is stored; and (v) the protected filter driver and security filter driver are software filter drivers.

* * * * *